United States Patent
Aghvami et al.

(10) Patent No.: US 9,872,216 B2
(45) Date of Patent: *Jan. 16, 2018

(54) INTER-ACCESS NETWORK HANDOVER

(71) Applicant: Uniloc Luxembourg S.A., Luxembourg (LU)

(72) Inventors: Abdol Hamid Aghvami, London (GB); Paul Anthony Pangalos, London (GB); Dev Pragad Audsin, London (GB)

(73) Assignee: Uniloc Luxembourg S.A., Luxembourg (LU)

( * ) Notice: Subject to any disclaimer, the term of this patent is extended or adjusted under 35 U.S.C. 154(b) by 488 days.

This patent is subject to a terminal disclaimer.

(21) Appl. No.: 14/479,034

(22) Filed: Sep. 5, 2014

(65) Prior Publication Data

US 2015/0163714 A1 Jun. 11, 2015

Related U.S. Application Data

(63) Continuation of application No. 12/634,324, filed on Dec. 9, 2009, now Pat. No. 8,855,083.

(30) Foreign Application Priority Data

Dec. 15, 2008 (GB) .................. 0822814.0

(51) Int. Cl.
*H04W 4/00* (2009.01)
*H04W 36/14* (2009.01)
(Continued)

(52) U.S. Cl.
CPC ....... *H04W 36/14* (2013.01); *H04W 36/0016* (2013.01); *H04W 36/0061* (2013.01);
(Continued)

(58) Field of Classification Search
None
See application file for complete search history.

(56) References Cited

U.S. PATENT DOCUMENTS 6,047,194 A 4/2000 Andersson
6,499,062 B1 12/2002 Shteyn
(Continued)

FOREIGN PATENT DOCUMENTS

GB 2452699 3/2009

OTHER PUBLICATIONS

Apostolopoulos, G., et al., "QoS Routing Mechanisms and OSPF Extensions," Aug. 1999, pp. 1-50.
(Continued)

*Primary Examiner* — Jutai Kao
(74) *Attorney, Agent, or Firm* — Sean D. Burdick

(57) ABSTRACT

In a wireless network environment comprising first and second packet-switched access networks, each access network using a tunnelling-type micro-mobility protocol and a Quality of Service (QoS) routing protocol to route packet data to and from mobile nodes attached thereto, and each access network comprising an access router to which a mobile node may attach, a mobility agent with which said mobile node may register and a gateway, a method of facilitating network layer handover of said mobile node from said first access network to said second access network, said mobile node registered in said first access network with a serving mobility agent, which method comprises the steps of: said mobile node receiving a router advertisement from said second access network, which router advertisement comprises a network-layer address of a target mobility agent in said second access network with which said mobile node may register; and said mobile node forwarding said network-layer address to said serving mobility agent, whereby
(Continued)

said serving mobility agent may communicate with said target mobility agent to facilitate network-layer handover of said mobile node to said second access network.

17 Claims, 6 Drawing Sheets

(51) Int. Cl.
| | |
|---|---|
| *H04W 36/00* | (2009.01) |
| *H04W 36/22* | (2009.01) |
| *H04W 36/30* | (2009.01) |
| *H04W 36/32* | (2009.01) |
| *H04W 60/04* | (2009.01) |
| *H04W 80/04* | (2009.01) |

(52) U.S. Cl.
CPC ............ *H04W 36/22* (2013.01); *H04W 36/30* (2013.01); *H04W 36/32* (2013.01); *H04W 60/04* (2013.01); *H04W 36/0044* (2013.01); *H04W 80/04* (2013.01)

(56) References Cited

U.S. PATENT DOCUMENTS

| | | | |
|---|---|---|---|
| 6,633,314 | B1 | 10/2003 | Tuli |
| 7,519,470 | B2 | 4/2009 | Brasche et al. |
| 7,522,995 | B2 | 4/2009 | Nortrup |
| 8,023,484 | B1 | 9/2011 | Huang et al. |
| 8,027,680 | B2* | 9/2011 | Thalanany ............ H04W 36/30 370/331 |
| 8,396,822 | B2 | 3/2013 | Dasgupta et al. |
| 8,855,083 | B2* | 10/2014 | Aghvami ........... H04W 36/0016 370/331 |
| 2002/0077114 | A1 | 6/2002 | Isham |
| 2002/0087335 | A1 | 7/2002 | Meyers et al. |
| 2004/0105420 | A1 | 6/2004 | Takeda et al. |
| 2004/0142657 | A1 | 7/2004 | Maeda |
| 2004/0240414 | A1 | 12/2004 | Fan et al. |
| 2005/0105491 | A1* | 5/2005 | Chaskar ............ H04W 36/0011 370/331 |
| 2005/0249175 | A1 | 11/2005 | Nasu et al. |
| 2006/0251022 | A1* | 11/2006 | Zhang .................. H04W 36/12 370/331 |
| 2007/0147320 | A1 | 6/2007 | Sattari et al. |
| 2007/0249348 | A1 | 10/2007 | Park |
| 2007/0286135 | A1 | 12/2007 | Kirke |
| 2008/0043614 | A1* | 2/2008 | Soliman ............... H04W 8/065 370/208 |
| 2008/0089293 | A1 | 4/2008 | Madour et al. |
| 2008/0137615 | A1* | 6/2008 | Park ..................... H04L 45/302 370/332 |
| 2008/0215623 | A1 | 9/2008 | Ramer et al. |
| 2008/0298309 | A1 | 12/2008 | DePietro et al. |
| 2009/0097453 | A1 | 4/2009 | Weniger et al. |
| 2009/0157310 | A1 | 6/2009 | Nortrup |
| 2009/0158396 | A1 | 6/2009 | Baum et al. |
| 2009/0187659 | A1 | 7/2009 | Savoure |
| 2009/0219890 | A1* | 9/2009 | Zhang ..................... H04W 8/20 370/331 |
| 2009/0300120 | A1 | 12/2009 | Schmidt |
| 2010/0015956 | A1 | 1/2010 | Qu et al. |
| 2010/0290621 | A1 | 11/2010 | Muhanna et al. |

OTHER PUBLICATIONS

Blake, S. et al., "An Architecture for Differentiated Service," Dec. 1998, pp. 1-36.
Durham, D., et al., "The COPS (Common Open Policy Service) Protocol," Jan. 2000, pp. 1-38.
Emmelmann, M., "Influence of Velocity on the Handover Delay Associated with a Radio-Signal-Measurement-based Handover Decision," IEEE, 2005, pp. 2282-2286.
McCann, P., "Mobile IPv6 Fast Handovers for 802.11 Networks," Nov. 2005, pp. 1-15.
Nichols, K., "A Two-bit Differentiated Services Architecture for the Internet," Jul. 1999, pp. 1-30.
Pragad, A.D., et al. "A Combined Motility and QoS Framework for Delivering Ubiquitous Services," undated, pp. 1-5.
Pragad, A.D., et al., "Optimal Configuration of Mobility Agents in Broadband Wireless Access Networks," undated, pp. 1-6.
Pragad, A.D., et al., "The Impact of Mobility Agent based Micro Mobility on the Capacity of Wireless Access Networks," undated pp. 1-6.
Sheng, Y., et al., "An Integrated QoS, Security and Mobility Framework for Delivering Ubiquitous Services Across All IP-Based Networks" undated, pp. 1-5.
Xie, G., et al., "Handover Latency of MIPv6 Implementation in Linux," IEEE, 2007, pp. 1780-1785.
Arkko, J., et al., Using IPsec to Protect Mobile IPv6 Signaling Between Mobile Nodes and Home Agents, http://tools.ietf.org/rfc/rfc3776.txt, Jun. 2004, pp. 1-36.
Braden, R., et al., "Integrated Services in the Internet Architecture: an Overview," Jul. 1994, pp. 1-28.
Braden, R., et al., "Resource ReSerVation Protocol (RSVP)-Version 1 Functional Specification," Sep. 1997, pp. 1-112.
Devarapalli, V. et al., "Network Mobility (NEMO) Basic Support Protocol," Jan. 2005, pp. 1-33.
Fu, X., et al., "QoS-Conditionalized Handoff for Mobile IPv6,"Networking 2002, 2002, pp. 721-730, Springer-Verlag, Berlin.
Harrington, D., et al., "An Architecture for Describing Simple Network Management Protocol (SNMP) Management Frameworks," RFC 3411, IETF, Dec. 2002, pp. 1-64.
Johnson, D., et al., "Mobility Support in IPv6," RFC 3775, Jun. 2004, pp. 1-165.
Neilson, R., et al., "A Discussion of Bandwidth Broker Requirements for Internet2 QBone Deployment," Internet2 QBone BB Advisory Council, Aug. 1999, pp. 1-30.
Perkins, C., "IP Mobility Support for IPv4," http://tool.iet.org/rfc/rfc3344.txt, Aug. 2002, pp. 1-87.
Soliman, H. et al., "Hierarchical Mobile IPv6 Mobility Management (HMIPv6)," Aug. 2005, pp. 1-29.

* cited by examiner

INTER-ACCESS NETWORK HANDOVER

CROSS-REFERENCE TO RELATED APPLICATION(S)

This patent application is a continuation of U.S. patent application Ser. No. 12/634,324 filed on Dec. 9, 2009 which claims foreign priority to United Kingdom Patent Application Serial Number 08 228 14.0 filed Dec. 15, 2008, the entire disclosure of which is herein incorporated by reference. The benefit of such earlier filing dates is hereby claimed by applicant under 35 U.S.C. §120.

BACKGROUND OF THE INVENTION

1. Field of the Invention

The present invention relates to a method facilitating network layer handover of a mobile node between access networks that use a tunnelling-type micro-mobility protocol and a Quality of Service (QoS) routing protocol, to a packet-switched wireless access network for taking part in the method, to various routers for use in the method, to a mobile node for use in the method, and to a method of manufacturing such a mobile node.

2. Description of the Related Art

Many different requirements are expected of the network layer in all-IP access networks (e.g. 4G cellular networks). Two in particular are mobility and QoS. The former enables users to communicate seamlessly with remote network nodes via the Internet wherever they are, whereas the latter enables users to receive different levels of service for certain types of traffic. However, research has shown that problems may arise when attempting to configure an access network to operate a mobility protocol at the same time as a QoS routing protocol.

Best effort routing protocols such as Open Shortest Path First (OSPF) have been extended with QoS functionality. For example QoS Extensions to OSPF (QoSPF) (see RFC 2676) have been proposed in which the routing architecture of OSPF is augmented to include QoS-related link metrics e.g. the amount of bandwidth available at each link. Since OSPF (and therefore QoSPF) is an intra-domain link state routing algorithm, each router in the access network stores a database of the entire topology of the domain. Each router discovers its neighboring routers and sub-networks, and advertises its local environment to other routers in the administrative scope of the network using a reliable flooding mechanism. These advertisements are stored and updated to synchronize routing knowledge in the network. The routers in the network may operate on an explicit route basis or on a hop-by-hop basis.

When operating a QoS routing algorithm it is prudent to operate some resource reservation system. For example a Bandwidth Broker may be used to admit a Reservation Request for a packet flow to travel a certain path across the access network. The Bandwidth Broker stores a database of the network topology and link state (based on the router advertisements for example). Using the database the Bandwidth Broker can decide whether or not to accept the Reservation Request Therefore for hop-by-hop routing, although in principle the QoS route might be changed by routers on the path as new link state information is gained, this is not practical since a new Reservation Request would need to be made to the Bandwidth Broker. Accordingly, once the route is chosen for the session the hop-by-hop route does not change until a handover is performed.

Mobility at the network layer is concerned with maintaining the mutability of packet data to and from a mobile node when that mobile node moves away from its home access network. The main candidate for provision of this functionality is Mobile IP (MIP}. Very briefly MIP relies on a Home Agent in the home access network to tunnel IP packets to the domain where the mobile node is attached. The mobile node forms a Care-of Address (CoA) that is globally topologically correct in the network to which it is attached. The Home Agent encapsulates packets that it receives (addressed to the mobile node's home address) in another IP packet addressed to the CoA. In this way packet data may still reach the mobile node even when it is away from the home network. Further details of Mobile IP can be found in RFC 3344, 3775 and 3776 to which reference is specifically made.

However, when a mobile node hands over to a new access router, binding updates are triggered to the Home Agent, etc. These binding updates can introduce unwanted delays and loss of packets, and thereby degradation in performance from the user's perspective. When attached to a particular wireless access network (such as a cellular network), a mobile node may change its point of attachment (i.e. access router) quite frequently (e.g. every few minutes or more often, particularly if on the move). Each change triggers configuration of a new CoA, followed by the necessary binding updates. Doing this frequently (e.g. every few minutes) is not practical.

Hierarchical Mobile IPv6 (HMIPv6) has been proposed (see RFC 4140) to address this problem. HMIPv6 provides a mobility agent known as a Mobility Anchor Point (MAP) in the access network. A MAP is a logical entity that handles micro-mobility for the mobile node. Micro-mobility is a change in point of attachment of the mobile node from one access router to another, both of which are within the same domain of the access network. Whenever this happens, the mobile node sends a binding update to the MAP (comprising a new Link local CoA or LCoA), but the mobile node's primary CoA (or Regional CoA or RCoA) remains unchanged. In this way the mobile node can move between access routers in the same administrative domain without having to send a binding update to the Home Agent. In contrast when the mobile node changes point of attachment to an access router in a different access network, this is a macro-mobility event i.e. requiring a binding update to be sent to the Home Agent of the mobile node.

When an access network operates both a mobility protocol (such as HMIPv6) and a QoS routing protocol, the requirement for all packets to pass through a particular MAP in the domain breaks one QoS route (gateway to access router and vice versa) into two. In particular, due to the high volume of traffic that it handles, it is almost certain that the MAP does not lie on the best QoS route from the gateway to the access router. Even though two QoS routes are then calculated (gateway to MAP, MAP to access router), their combination is by definition not the best QoS route if the MAP does not lie on the route that would be computed between the gateway and the access router. This causes a routing conflict between mobility on the one hand and QoS routing on the other. Thus attempts to operate both tunnelling-type mobility protocols and QoS routing protocols at the same time have not produced the performance gains that might be expected.

One way to address this problem was described in our co-pending UK patent application number 0716529.3 (the disclosure of which is incorporated fully herein for all purposes). That document disclosed for a mobile node visiting a packet-switched wireless access network, said access network using a tunnelling-type micro-mobility protocol and a Quality of Service (QoS) routing protocol to route packet data to and from said mobile node, and comprising an access router to which said mobile node may attach, a mobility agent and a gateway, a method of configuring said access network to route packet data toward said mobile node which method comprises the steps of:

(a) receiving in said access network a handover indication of said mobile node or a login request therefrom;

(b) in response to said handover indication or login request computing a QoS route for said mobile node, which QoS route is useable to route packets between said mobility agent and said mobile node;

(c) performing step (b) at a location in said access network remote from said mobility agent; and (d) transmitting said QoS route and said handover indication or login request from said remote location toward said mobility agent;

whereby upon receipt of data transmitted in step (d) said mobility agent may handle both mobility configuration and QoS route configuration for said mobile node as part of said network layer handover. In one embodiment, one QoS route (between mobility agent and access router) was calculated by the access router, and the second QoS route (between gateway and mobility agent) was calculated by the mobility agent We have identified a problem that arises in a network environment comprising a plurality of such networks, each having a limited geographical area of coverage provided by wireless access points (such as one or more UMTS Node B for example). When a mobile node establishes one or more data session (such as a web browsing, streaming, or packet data call e.g. VoIP) in one network, there is some probability that the mobile node will move to the edge of the area of signal coverage of that network during whilst the session(s) is ongoing. As mentioned above, this necessitates a macro-mobility event. It is necessary to handover the sessions of the mobile node to the new network and such a handover is referred to herein as an inter-access network handover. It is to be noted that this problem is quite different from the problem of intra-access network handovers, which is specifically addressed in RFC 4140.

During an inter-access network handover full re-establishment of mobility and QoS must take place. Such a handover is possible under MIPv4 or MIPv6, but results in large delays that increase packet loss and the chances of breaking up the ongoing session(s) of the mobile node (e.g. due to timeouts of TCP connections). For example in G. Xie et al., "Handover Latency if MIPv6 Implementation in Linux", IEEE Globecom Proceedings, November 2007, it was found that handover delays could be as long as 3.6 s. This delay is only associated with Mobile IP. If the access network also supports HMIP and QoS, the delay in registering with the new mobility agent and setting up QoS routes is expected to be longer still, and certainly unacceptable from the point of view of session continuity.

The delays associated with mobility can be sub-divided into: (i) movement detection delay; (ii) CoA configuration delay including Duplicate Address Detection (DAD) and local binding update; and (iii) Mobile IP binding update delays. The first of these delays is caused by the interval that router advertisements are broadcast in the new network (e.g. every few seconds). For example, if a mobile node moves and has to wait 5 s before receiving a router advertisement, this delays the start of the handover process. The second of these delays is caused by the time taken to configure both RCoA and LCoA addresses, send them to the new MAP (or EN) in a local binding update, and for the MAP to perform DAD, and acknowledge to the mobile node that it is now registered in the new network. Only then is the mobile node able to send a Mobile IP binding update to its Home Agent and any correspondent node(s). The Mobile IP binding update and acknowledgement causes the third time delay. The sum of all these delays is expected to last anything from a few seconds to up 30 s, causing most sessions to be interrupted.

After this, further delays are expected to be caused by QoS set-up. In particular, once the mobile node has registered with the new mobility agent in the new access network, QoS has to be set up for the mobile node. If the new access network supports IntServ this can cause severe delays whilst resources are reserved along the path from the gateway to the mobility agent, and from the mobility agent to the access router. If the access network supports DiffServ, negotiation must take place with a Bandwidth Broker for admission of the session(s) of the mobile node. Furthermore, all of the link-layer mappings for the mobile node must be re-established in the new access network. In particular for each session of the mobile node, the access point or the access router holds a set of QoS mappings. These mappings translate the network-layer QoS classes in the wired part of the network to the scheduling at the link and physical layers in the wireless part, and vice-versa. In this way the QoS for each session can be preserved across all links in the network Accordingly it is clear that delays caused by mobility and QoS set-up procedures will be problematic from the point of view of ensuring seamless connectivity from the user's perspective.

Audsin, D. P et al., "A Combined Mobility and QoS Framework for Delivering Ubiquitous Services", PIMRC 2008, 15-18 Sep. 2008 mentions the problem of inter-access network handover between networks of the type mentioned. It is suggested so-called Enhanced Nodes (ENs) present in each access network will communicate with each other to exchange appropriate information, effectively forming a logical link between the networks. In particular, QoS and security context information can be transferred from one network to the other, allowing for faster re-establishment of sessions in the new network An EN is an IP router that extends the functionality of a MAP. In particular, an EN comprises a network support sub-layer which performs three main functionalities: mobility management, QoS and security. Each of these functions is logically inter-connected with a radio resource management function. Finally a signaling part of the EN enables the EN to gather information and share information the signaling other ENs.

However, it is not explained how inter-access network handovers might be initiated, nor how the Enhanced Nodes are able to communicate with one another.

SUMMARY OF THE INVENTION

According to the present invention there is provided in a wireless network environment comprising first and second packet-switched access networks, each access network using a tunnelling-type micro-mobility protocol and a Quality of Service (QoS) routing protocol to route packet data to and from mobile nodes attached thereto, and each access network comprising an access router to which a mobile node may attach, a mobility agent with which said mobile node may register and a gateway, a method of facilitating network layer handover of said mobile node from said first access network to said second access network, said mobile node registered in said first access network with a serving mobility agent, which method comprises the steps of:
(a) said mobile node receiving a router advertisement from said second access network, which router advertisement comprises a network-layer address of a target mobility agent in said second access network with which said mobile node may register; and
(b) said mobile node forwarding said network-layer address to said serving mobility agent, whereby said serving mobility agent may communicate with said target mobility agent to facilitate network-layer handover of said mobile node to said second access network. The network-layer address may be an IPv4 address or an IPv6 address for example. The router advertisement may be an ICMP Router Advertisement message in accordance with that defined in RFC 1256. The terms 'target' and 'serving' used in conjunction with the mobility agent are purely to identify different mobility agents; it will be understood that in practice a mobility agent may act as both a 'target' and 'serving' mobility agent at the same time.

At least some embodiments of the invention permit mobility and QoS admission procedures in the second access network to take place (or at least be initiated by the mobile node) prior to handover at the network layer of the mobile node. This is a significant advantage since all three aspects of the mobility delays mentioned above, and the delays caused by QoS setup, can be reduced or eliminated altogether. The magnitude of the reduction is dependent on whether or not and for how long the mobile node is able to maintain connectivity with the first access network For example, if the mobile node moves out if signal coverage at the physical layer of the first access network before sending the network-layer address, the mobile node is likely to face all of the delays. If, however, the mobile node is able to trigger the handover preparation in the second access network before it loses connectivity with the first, at least some of the delays mentioned should be reduced.

If there is more than one target mobility agent available to the mobile node, each network-layer address that is received may be forwarded to said serving mobility agent. Upon receipt of several different router advertisements, the mobile node may use data carried in each router advertisement to select one target mobility agent to contact first. In certain embodiments this data may comprise an indication of the distance between the mobile node and the target mobility agent (given for example in a Dist field per RFC 4140), and/or an indication of the availability of the target mobility agent (given for example in terms of a preference value per RFC 4140). If the target mobility agents are viewed as roughly similar or the same in terms of distance and/or availability the mobile node may choose one at random to contact first. In other embodiments the mobile node may forward the router advertisement substantially as received. In such embodiments, upon receipt of several different router advertisements from the same mobile node, the serving mobility agent may perform the selection of the target mobility agent instead.

The tunnelling-type micro-mobility protocol may be HMIPv6, or any similar protocol similar, or any protocol derived from HMIPv6. The Quality of Service (QoS) routing protocol may be QoSPF, or any similar protocol similar, or any protocol derived from QoSPF. At the time of the filing, to the best of the applicant's knowledge and belief HMIPv6 as described in RFC 4140 is viewed as the most likely candidate for commercial implementation. It is to be understood however, that the invention is not limited to this one protocol or protocols derived therefrom, but will find use in any micro-mobility protocol that uses router advertisements to advertise the presence of mobility agents.

In certain embodiments step (b) comprises said mobile node forwarding said router advertisement substantially as received. One advantage of this is that other data in the router advertisement can be used to establish communication with the target mobility agent. The other data in the router advertisement typically comprises information on the local mobility agents that are available in the second access network. This information is unavailable to the first (i.e. previous or current) access network. Thus, the mobile node may forward this data to the serving mobility agent, ultimately enabling the target mobility agent to process this additional data as needed.

In some embodiments, the method further comprises the step of said mobile node transmitting an identifier with said router advertisement, which identifier is useable to identify said mobile node in both said first and second access networks.

The mobile node may configure said identifier as an on-link care-of address (LCoA) using data within said router advertisement, and then forward said on-link care-of address to said serving mobility agent with said router advertisement.

In some embodiments, the method further comprises the step of said serving mobility agent storing and forwarding said identifier to said target mobility agent.

In some embodiments, the method further comprises the step of said first access network using said network-layer address to send handover data about ongoing session(s) of said mobile node to said second access network, upon receipt of which said second access network uses said data to perform at least a part of its admission procedure prior to handover of said mobile node.

In certain embodiments, said handover data may comprise quality of service (QoS) context data useable by said target mobility agent to determine as part of said admission procedure whether or not said second access network is able to provide the same or a similar QoS to said ongoing session(s) of said mobile node. In this way the target access network is able to discover the QoS requirements of the mobile node prior to handover at the network layer. This is expected to greatly reduce the chances of handover to a network that cannot meet the requested QoS, otherwise causing blocking.

In some embodiments, the method further comprises the step of said target mobility agent initiating computation of at least one QoS route across said second access network for packet data of said ongoing session(s) of said mobile node. This is particularly advantageous: the target mobility agent is able to cause the new QoS routes for the mobile node to be determined before handover takes place; it is expected that this will greatly reduce delays during handover.

In some embodiments, the method further comprises the step of said target access router storing said identifier for subsequent identification of said mobile node. This helps the target mobility agent to recognize the packets sent by the mobile node in subsequent steps of the method. For example, the final step of the network-layer handover is for the mobile node to send a local binding update to the target mobility agent. By using an identifier in the way, the target mobility agent is able to recognize the mobile node and retrieve the QoS parameters that have already been set up.

In some embodiments, if said second access network has determined that it can meet the QoS requirements of said ongoing session(s), either at the requested level or some other level, the method further comprises the step of establishing a temporary tunnel between said serving mobility agent and said target mobility agent, which temporary tunnel is useable to route packets arriving at said serving mobility agent intended for said mobile node to said target mobility agent. One advantage of this is that packet loss is reduced. For example, once handover is under way the serving mobility agent may duplicate received packets and send them through a serving access router and through the temporary tunnel. In this way, the mobile node either receives the packets from the first access network or from the second access network, reducing the chance of lost packets.

Following handover of said mobile node at the physical and link layers, said serving mobility agent may forward packets addressed to said mobile node through said temporary tunnel to said target access network.

In some embodiments, following handover of said mobile node at the physical and link layers, said mobile node initiates a handover at the network layer by sending to said target mobility agent a registration message comprising said identifier of said mobile node.

Upon receipt of said registration message, said target mobility agent uses said identifier to lookup the pre-computed QoS route(s) it has stored for said mobile node.

Messages sent by said mobile node to said serving mobility agent and to said target mobility agent may be in the form of a local binding update message of a type according to HMIPv6, which message comprises a flag indicate to said mobility agents whether the message is a normal local binding update, a local binding update comprising a router advertisement or a local binding update following handover preparation.

According to another aspect of the present invention there is provided a packet-switched wireless access network configured to perform the first access network method steps set out above.

According to another aspect of the present invention there is provided a router comprising a memory storing computer executable instructions that when executed bring perform the serving mobility agent method steps set out above.

According to yet another aspect of the present invention there is provided a packet-switched wireless access network configured to perform the second access network method steps set out above.

According to another aspect of the present invention there is provided a router comprising a memory storing computer executable instructions that when executed bring perform the target mobility agent method steps set out above.

According to another aspect of the present invention there is provided for use in a method as set out herein, a mobile node having a memory storing computer executable instructions that when executed cause said mobile node to perform the following steps:

(a) determine whether each router advertisement it receives is from an access router in a first access network to which it is presently attached, or from a second access network different from said first; and (b) if from a second access network, to forward said router advertisement to a serving mobility agent in said first access network.

In some embodiments said computer executable instructions cause said mobile node to perform any of the mobile node steps set out herein.

According to yet another aspect of the present invention there is provided a method of manufacturing a mobile node, which method comprises the steps of storing in a memory of said mobile node computer executable instructions that when executed perform the mobile node method steps set out above.

BRIEF DESCRIPTION OF THE FIGURES

For a better understanding of how the invention may be put into practice, preferred embodiments of the invention applied in a heterogeneous network environment comprising three access networks will be described, by way of example only, with reference to the accompanying drawings, in which.

DETAILED DESCRIPTION OF THE PREFERRED EMBODIMENT(S)

Figure 1:
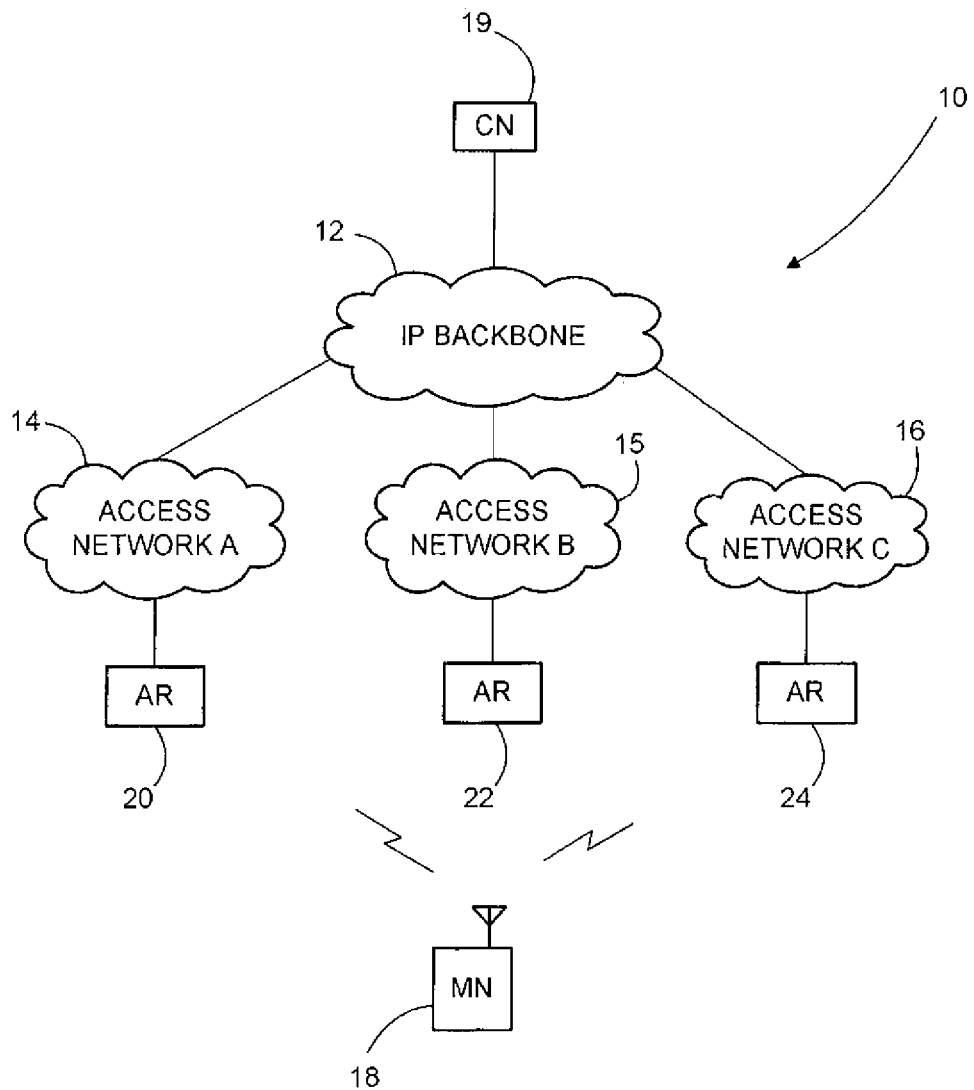
FIG. 1 is a schematic block diagram of a network environment comprising three access networks, each having the functionality of the invention and which provide access to the Internet or other IP backbone network for mobile nodes.

Referring to FIG. 1 an IP-based (IPv4 or IPv6 or a mixture thereof may be used in any of the networks mentioned herein) network environment generally identified by reference numeral 10 comprises an IP backbone 12 having a number of interconnected routers that provide access for network nodes to data and services stored on remote servers for example. As such the IP backbone 12 may form part of the Internet. In this embodiment any three IP-based access networks 14, 15, 16 provide access for a wireless mobile node (MN) 18 to the IP backbone 12, although there may be any number of access networks and mobile nodes of course. The access networks 14, 15, 16 may be an IP-based cellular network (such as 3GPP Release 5 or 6, UMTS Long Term Evolution (LTE) or any future IP-enabled cellular network) or the combination of an ISP and a number of WLAN routers for example. Access to the IP backbone 12 enables the MN 18 to communicate with a correspondent node (CN) 19. The CN 19 may be a media server, a web server or another mobile node for example.

The MN 18 is physically separate from the access networks 14, 15, 16 but may communicate with one or more of them by means of a wireless link. Each access network 14, 15, 16 comprises an IP-enabled access router 20, 22, 24 that is a single hop (at the network layer) from the MN 18. Each access router 20, 22, 24 is connected to a wireless transceiver such as Node B or WLAN router for example.

Each access network 14, 15, 16 defines an administrative domain comprising a number of interconnected routers; therefore the domain is scoped so that at the edges of the network administration packets (such as link-state advertisements are dropped). Furthermore each access network 14, 15 and 16 and the MN 14 is able to operate Mobile IPv6 (MIPv6—see RFC 3775) and Hierarchical Mobile IPv6

(HMIPv6) as described in RFC 4140, or any functionally similar protocols. Both of these RFCs are fully incorporated herein by reference for all purposes. Thus each access network 14, 15, 16 comprises one or more router having the functionality of a mobility agent (or Mobility Anchor Point (MAP) in the terms of RFC 4140). The MAP is used by the MN 18 as a local Home Agent so that handovers between access routers in the same domain do not trigger a binding update to the Home Agent of the MN 18. The domain of each MAP is defined by the access routers that advertise the MAP information to attached MNs. As such there may be more than one MAP per access network.

Figure 2:
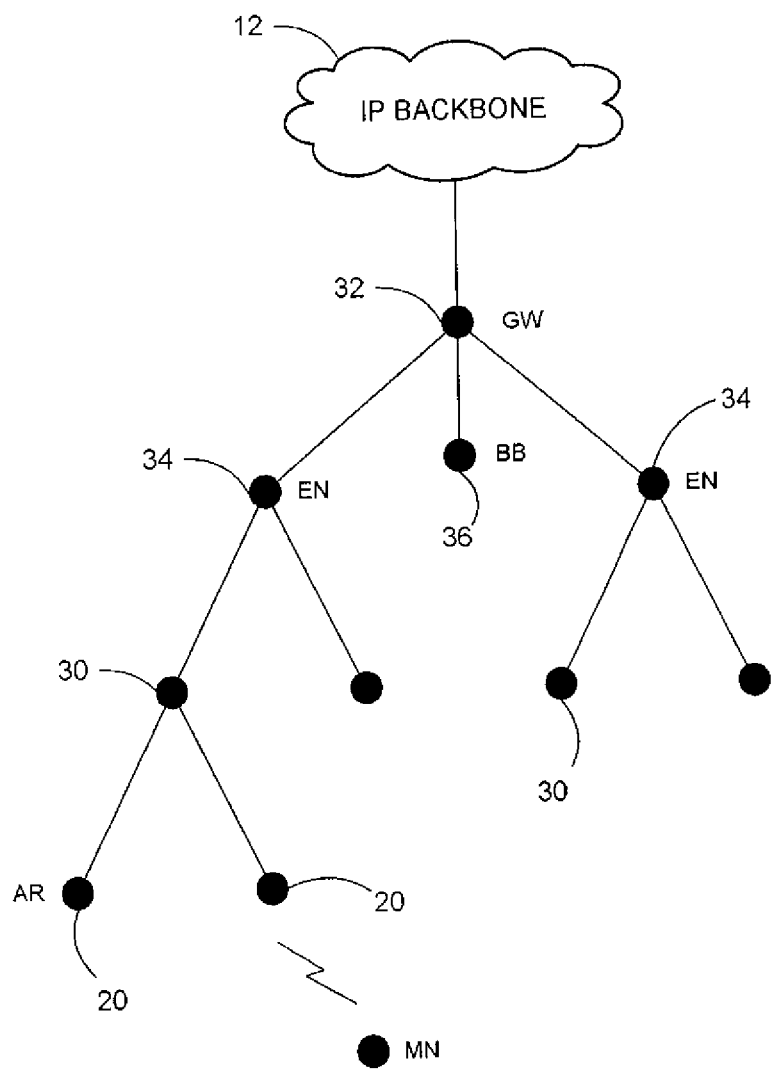
FIG. 2 is a schematic block diagram of one of the access networks in FIG. 1.

Referring to FIG. 2 the access network 14 comprises a number of interconnected router 30. A gateway router (GW) 32 is the only entry and exit point of the access network 14 for packet traffic to and from the IP backbone 12. Two mobility agents hereinafter referred to as Enhanced Nodes (EN) 34, 36 are each similar to a MAP as described in RFC 4140 but also comprise functionality as described herein. In particular, the primary functionality of an EN is to gather QoS, security and mobility information from various parts of the access network and to share this information with other logical entities within the access network. The functionality of such an EN is extended by the present invention as described herein. It is possible for any of the access networks to have any number of ENs, each located at any point in the network. Each of the functions performed by an EN is described below:

1) Mobility Management: The mobility component of the network sub-layer provides the framework to manage all mobility management-related functionality within an access network, as well as facilitating the mobility of terminals across access networks. This function enhances existing mobility management mechanisms and solutions by providing additional information to make optimal decisions regarding the movement of nodes both within and across access networks. The framework also provides a method for the mobility entity to interact with QoS parameters in the network through the QoS entity in the EN. The Mobility Management part of the EN plays the role of Mobility Agent in HMIPv6 (see RFC 4140).

2) Quality of Service: The QoS component of the EN plays a vital role in providing QoS both within and between heterogeneous networks. This entity provides a virtual link between access networks to share information regarding resources and other QoS parameters. For example, a per-flow based QoS architecture such as IntServ can benefit with the additional knowledge of the network in providing optimal resource reservations and reducing blocking probability. Re-establishing traffic flows after handover can also be enhanced by this entity, with the greater overview knowledge of the network, traffic flows can be optimally redirected to the new destination with minimum possible delays. This entity will work closely with routing in the network in identifying the paths with the required QoS. Traffic flow and congestion management also come under this entity. The QoS entity can interact with other entities performing tasks such as traffic shaping, congestion control, traffic flow management and QoS routing.

3) Signalling: The signalling entity of the EN plays an important part. This entity enables the EN to gather information and share information through signalling other ENs. The framework for co-operation between ENs is given in FIG. 3. It is desirable to make use of a common signaling approach where possible to minimize the delay associated with signaling sequentially. This allows the EN to process mobility and QoS combined signalling from the MNs or other entities thus preventing sequential signalling which contribute to large delays. The signalling used here could utilize a common signalling approach such as the QoS conditionalized handover binding update in X. Fu, H. Karl, and C. Kappler, "QoS-Conditionalized Handoff for Mobile IPv6," in *Networking* 2002, ser. LNCS, vol. 2345, 2002, pp. 721-730.

Each router 30 is Diffserv-capable (see e.g. RFC 2475) and each operates an intra-domain link-state QoS routing algorithm, for example QoSPF as described in RFC 2676; that document describes an extension to the Open Shortest Path First (OSPF) routing algorithm. The extension enables distribution of QoS information (e.g. link state) amongst all routers in the domain of the access network 14 so that they can each maintain a database of network topology and determine accurate and consistent QoS routes. However, it is also possible for the network to operate an IntServ type protocol.

The access network 14 also comprises a Bandwidth Broker (BB) 36. The BB 36 is a logical entity that is stored and executed on a network node within the domain. Further details of the architecture and function of Bandwidth Brokers can be found in "A Discussion of Bandwidth Broker Requirements for Internet Qbone Deployment", Neilson, R. et al., August 1999, to which reference is specifically made, hereinafter referred to as Neilson, the full contents of which is incorporated herein for all purposes. For example the BB 36 may function on the gateway GW 32 in the access network 14, or it may reside on a physically separate network node. The purpose of the BB 36 is to manage the QoS resources within a domain based on the Service Level Specifications (SLSs) that have been agreed in that domain (intra-domain communication), and to manage communication with other BBs in different domains (inter-domain communication). In this case, the BB 36 is responsible for the QoS resources in the access network 14. Given a specific QoS request by a user or other BB, a BB determines whether or not the requested QoS can be met by network nodes (usually routers) within the domain from one gateway in the domain to another. Each BB has access to the routing table of the network node on which it resides; accordingly by means of link state advertisement discussed in RFC 2676 it is aware of the QoS level (e.g. bandwidth) available over all links in its domain.

Figure 3A:
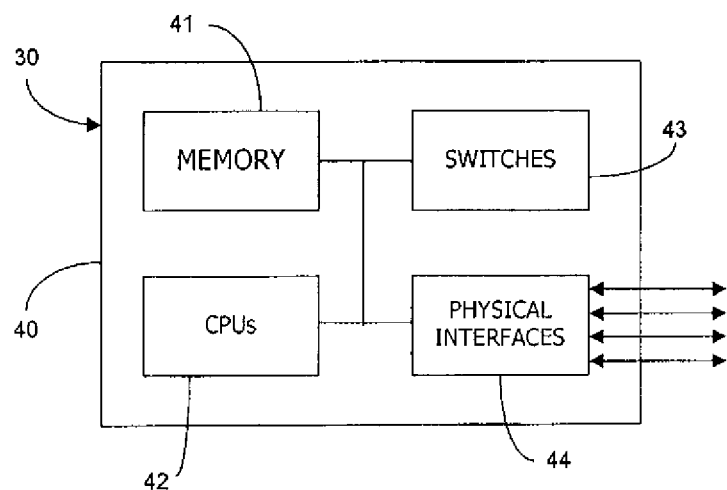
FIG. 3A is a schematic block diagram of computer hardware for storing and operating logical entities according to the present invention.

Referring to FIG. 3A one of the routers 30 comprises a housing 40, a memory 41, one or more CPU 42, switches 43 and physical interfaces 44. The physical interfaces 44 enable communication over a wired or wireless physical link with other routers 30 in the access network 14. The memory 41 may store computer executable instructions that when executed bring about the functionality one or more of the various logical entities described herein, e.g. AR 20, GW 32, EN 34 and BB 36.

Figure 3B:
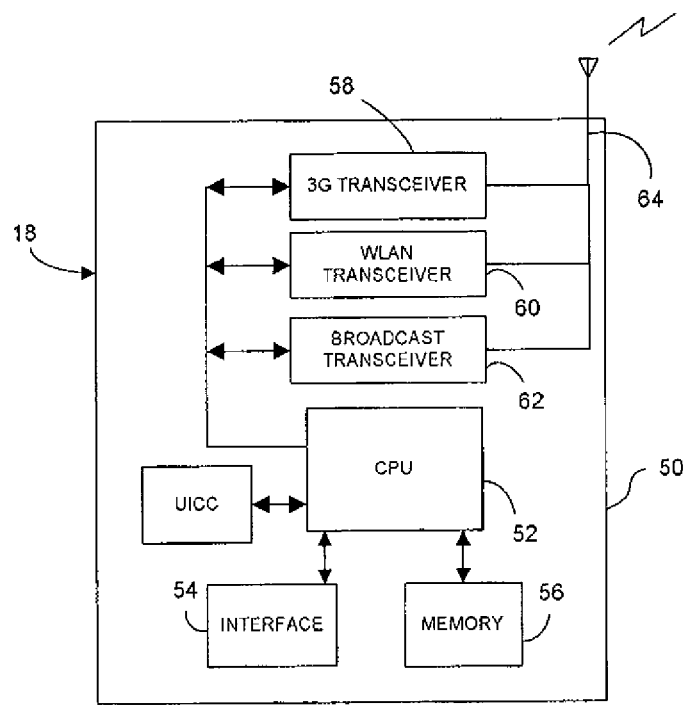
FIG. 3B is a schematic block diagram of a mobile node according to the present invention.
Figure 4:
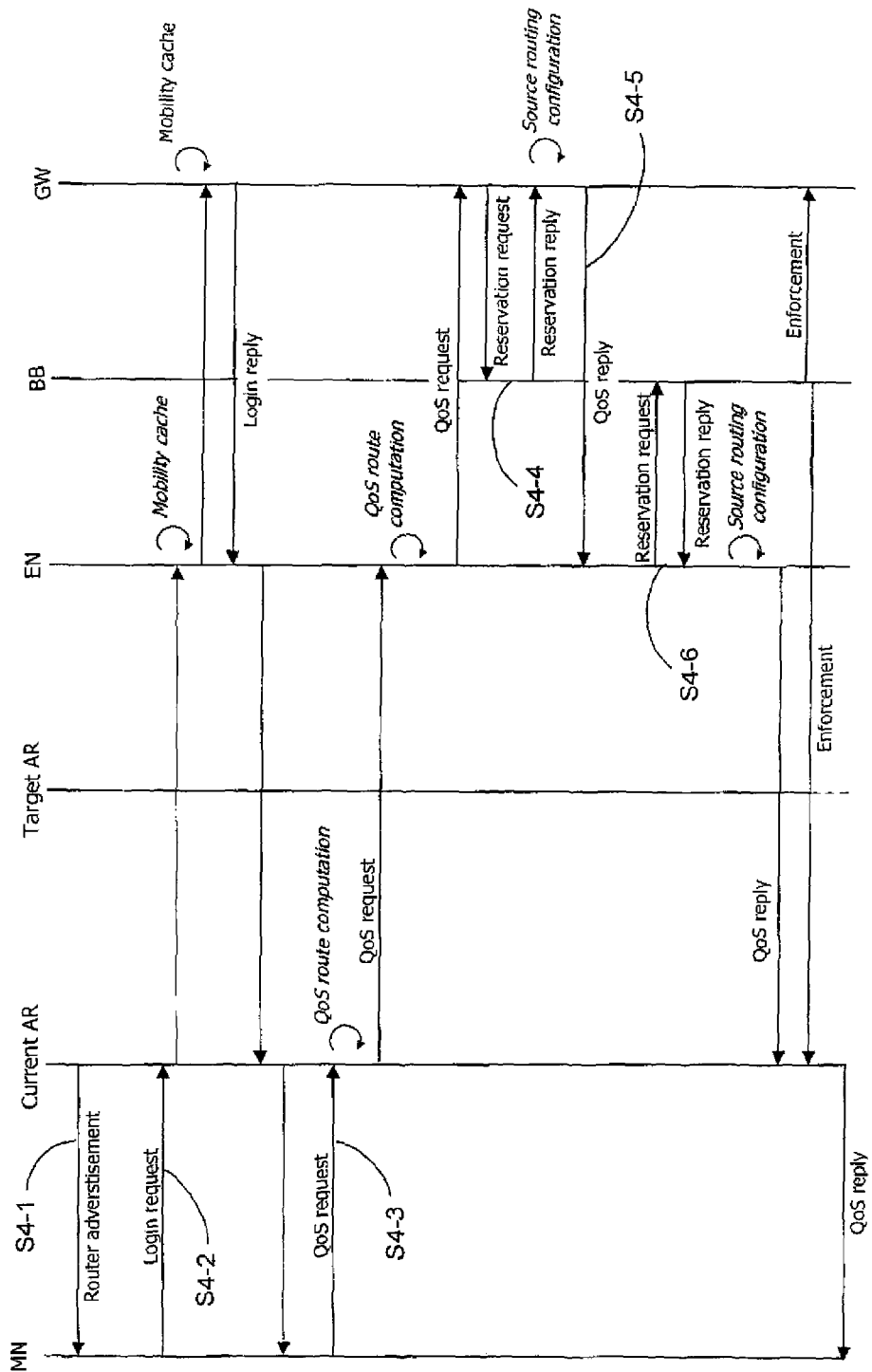
FIG. 4 is a signalling diagram of a login and session request phase of a method according to the present invention.

Referring to FIG. 3B the MN 18 comprises a case 50 housing a CPU 52, an interface 54, a computer memory 56, a 3G transceiver (or interface) 58, a WLAN transceiver (or interface) 60 and a broadcast transceiver (or interface) 62. The 3G transceiver 58 and the broadcast transceiver 62 are wired to an antenna 64 for reception and transmission of data with a mobile network and for reception of data from a broadcast network respectively. The WLAN transceiver 60 enables reception and transmission of data with wireless access points. The CPU 52 interfaces with all of the aforementioned components to process (store, access, etc.) electronic data. The memory 56 stores computer executable instructions that when executed by the CPU 44 perform the mobile node method steps as described herein. These computer executable instructions may be stored in the memory of the mobile during manufacture. It is to be noted that it is not essential for the mobile node to be multi-mode; the invention also has application for mobile nodes with only one interface.

There are various functions that the access network 14 must perform on behalf of the mobile node 18 if QoS and mobility are to be supported. The access network 14 must be able to support login requests from the MN 18. Such login requests include making bindings in one or more mobility cache for the MN so that packets can be routed successfully to and from it. Following that, it is important that the mobile node can handover from one access network to another with as little interruption to ongoing sessions as possible. Accordingly, the following phases are discussed below:

(1) Login;
(2) Handover Preparation; and
(3) Handover Execution.

Login Phase

When the MN 18 wishes to attach to the access network 14 (e.g. when the user moves it into the area of coverage of a Node B, or when the user switches the MN 18 on) it either awaits receipt of or solicits a Router Advertisement from an access router, in this case access router 20. The Router Advertisement comprises a MAP option that provides details of the EN (distance vector from the MN, preference for the particular EN, the EN's global IP address and subnet prefix). The MN 18 uses this data to auto-configure both a regional and a local care-of address and to log on to the access network. To do this the MN 18 follows the procedure described in RFC 4140 to which reference is specifically made in this respect (see in particular section 6.1). This process establishes the necessary mobility cache in the EN 34 and GW 32 respectively. In the mobility cache of the GW 32 a binding made for the MN 18 so that IP packets addressed by CNs to the MN's Regional Care-of Address (RCoA) are tunnelled to the EN 34. In the mobility cache of the EN 34 a binding is created between the RCoA and an On-Link Care-of Address (LCoA). The LCoA is an IP address configured by the MN 18 using the prefix advertised by the access router 20; the LCoA is not used for communication with any CN 16, but it used to tunnel packets from the EN 34 to the MN 18. Once logged on the access router 20 becomes the serving AR 20 of the MN 18.

At step S4-3 the MN 18 wishes to start a session (e.g. web-browsing, VoIP, etc.). To that end it sends a QoS Request toward the EN 34 containing inter alia the Service Level Specification (SLS) requested by the user which includes the DiffServ Code Point (DSCP) required (or requested). The serving AR 20 intercepts the Request and using its link state database pre-computes an explicit QoS route (i.e. end-to-end) from the EN 34 to itself i.e. in the downlink direction. The algorithm used to pre-compute the route follows that described in QOSPF (see RFC 2676 and Appendix D of that document). Once the QoS route is computed, the QoS Request and QoS route are forwarded to the EN 34 together with the list of routers on the pre-computed route.

Upon receiving the QoS Request the EN 34 stores in memory the pre-computed QoS route to the serving AR 20. The EN 34 then pre-computes (using the same method as the serving AR 20) a QoS route from the GW 32 to the EN 34 and forwards the QoS Request to the GW 32, together with the list of routers on the QoS route. The pre-computation of the route (from the GW 32 to the EN 34) at this stage may be omitted completely, dependent on the dynamics of the access network 14; for example the network capacity between the GW 32 and EN 34 may not present a bottleneck, so QoS routing between these two nodes may not be required all of the time (or indeed at all). Alternatively, the pre-computation may take place at the GW 32 if the network operator prefers.

The GW 32 then sends the pre-computed QoS route and requested DSCP to the BB 36 of the domain in the form of a Reservation Request at step S4-4. Communication between the GW 32 and BB 36 may take place using the COPS protocol (RFC 2748). The BB 36 makes a decision to accept or refuse the request (e.g. based on policies of the access network operator and sends a reply to the GW 32. If the result of the Reservation Request is not successful, the DSCP of the session can be downgraded to a lower class and another attempt made.

Assuming that the reservation is successful, the GW 32 then configures itself to route packets to the EN 34 using the pre-computed QoS route and DSCP. In order to ensure that the pre-computed route is followed by packets to the EN 34, the GW 32 uses source routing: this list of routers to be traversed is added to each forwarded IP packet using an extension header. In IPv6 this option is available in the routing header under the routing type field; furthermore each address present in the header can be strict or loose according to the preference of the network administrator. Once this is complete a QoS Reply is sent from the GW 32 to the EN 34 at step S4-5. The QoS Reply comprises the current DSCP (i.e. that negotiated by the GW 32 with the BB 36—which might be different to that requested) and the negotiated SLS; if the reservation by the GW 32 is lower than that requested by the MN 18 the lower DSCP is used for the current session, but the requested DSCP may be stored in memory for a subsequent request.

At step S4-6 the EN 32 now sends a Reservation Request to the BB 36 for the pre-computed QoS route from the EN to the serving AR 20 and for the DSCP assigned for the session in the QoS reply. Assuming successful, the EN 34 configures itself to route packets to the serving AR 20 using the pre-computed QoS route. The EN 34 also uses source routing to ensure that the pre-computed route is followed. The BB 36 may decide to downgrade the DSCP at this stage.

The combination of QoS routes pre-computed at the edges of the access network 14 and the use of source routing enables the method to be scaled for access networks of a wide variety of sizes (in terms of number of routers). This is because route computation is performed at the edges of the network by only a few network nodes, allowing the functionality of other routers in the access network to remain comparatively simple.

After configuration of the EN 34, it sends a QoS Reply message to the serving AR 20 that comprises the DSCP and an indication that the original QoS Request is accepted. The QoS Reply is intercepted by the serving AR 20 which then updates its source routing configuration (downlink direction) for the MN 18. Following this the QoS Reply is forwarded to the MN 18 which can then commence the session using the assigned DSCP. Either at this point or when the login request was received, the serving AR 20 may also pre-compute a QoS route from itself to the EN i.e. in the uplink direction. The steps of the method may then be repeated in order to reserve the necessary resources (between AR 20 and EN 34, and EN 34 and GW 32).

This procedure is repeated for each session started by the MN 18. Differentiation between a number of sessions for a single MN is made on the basis of source and destination port numbers.

This method of the invention facilitates distribution of the load of computing QoS routes within the access network, and moves this load toward the edge of the access network In one aspect this edge comprises one or more access router; in another aspect QoS route computation may be performed by one or more MAP on behalf of a gateway to the network domain. This has the further advantage that an access network according to the invention is able to operate a QoS protocol such as DiffServ which requires that computational complexity is kept at the edge of the network and that core routers have comparatively simple functionality. Furthermore this facilitates scalability compared to a method in which only one node is performing all QoS routing and mobility calculations.

It is to be noted that the invention provides for computation of several QoS routes (e.g. GW→EN and EN→AR). It is envisaged that both of these routes may be computed at the access router if the EN and gateway are in the same routing area for example; in that case the access router has knowledge of the appropriate topology. This choice is implementation specific and left to the network operator. It is also possible that the step of computing a route from GW→EN may be omitted completely in the appropriate circumstances.

Handover Preparation

Figure 5A:
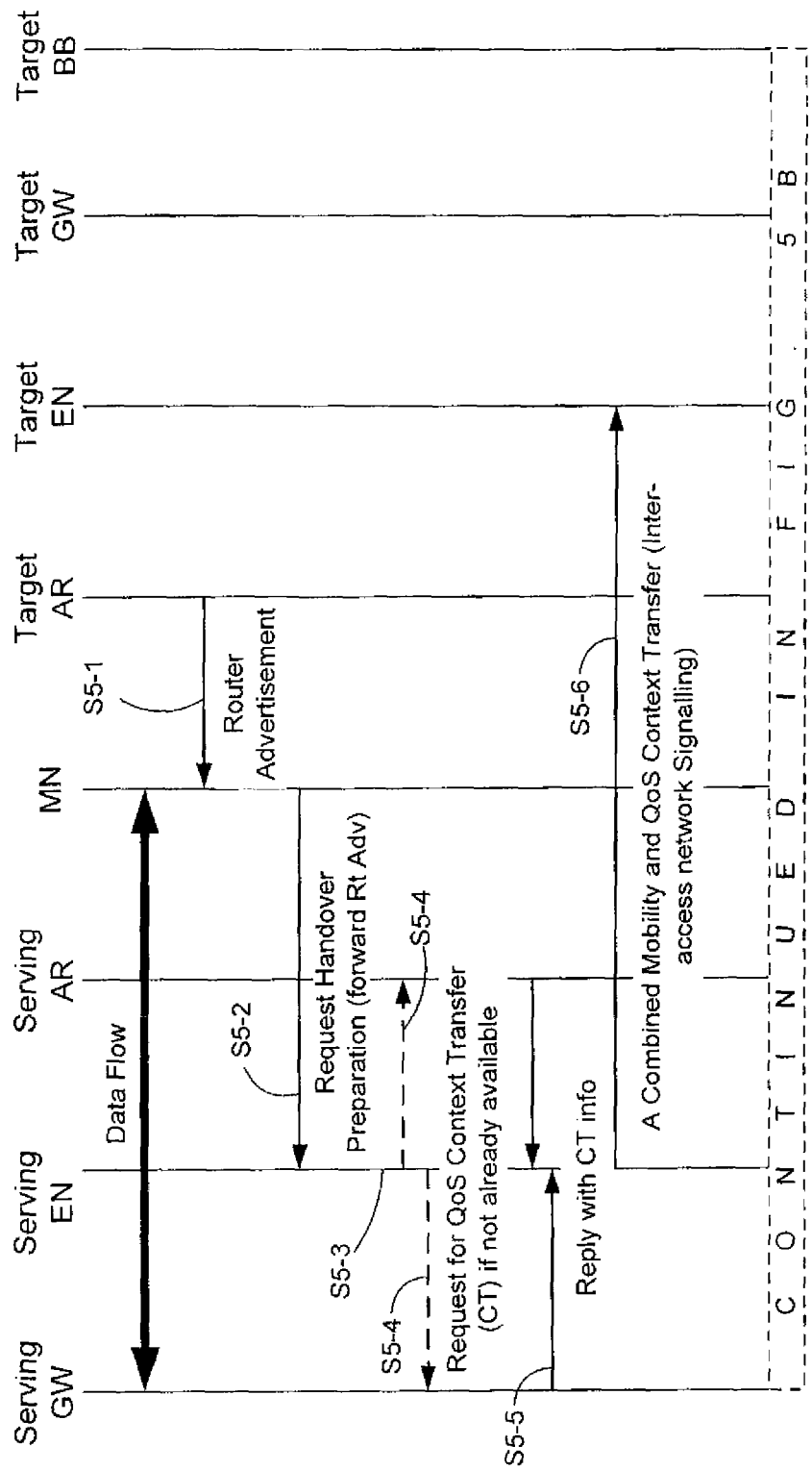
FIGS. 5A and 5B are a signalling diagram of a handover preparation phase of a method according to the present invention.

It may become beneficial or necessary for the MN 18 to handover from the serving AR 20 to a new AR 22 ('target AR') in a different EN domain in a different access network, for example handover from access network 14 to access network 15 in FIG. 1. Referring to FIG. 5A, the data flow in a session or sessions established as per the description above under Login Phase is shown by a bi-directional arrow between the gateway 32 and the MN 18.

When the MN 18 moves within wireless signal range of a different access network (for example when the user of the MN 18 moves physical location) it may be decided, either by the current access network 14 or the MN 18, that handover to the new access network 16 is appropriate or necessary (e.g. using some mechanism such as signal strength at the MN 18, or the access network 14 forcing the MN 18 to handover for example). At step S5-1 the MN 18 becomes aware of one or more AR in one or more new access network via Router Advertisements sent by the or each AR, and the MN 18 selects an access network (e.g. based on profiles stored in the MN) and a target AR 22 within that network according to wireless signal strength and/or other factors. A Router Advertisement comprises the MAP option as described in RFC 4140, and in particular the MAP option comprises the global IP address of the EN responsible for that MAP domain. The MN 18 may receive more than one Router Advertisement, each with a different MAP option advertising a different EN. The order of ENs with which the MN 18 prefers to register may be decided using the preference field and the distance field carried in the MAP option. The preference field is a 4-bit integer assigned by the MAP (e.g. 0 indicates unavailable) and the distance field is a 4-bit integer indicating the distance (in hops) between the EN and the MN 18. For example, the MN 18 may select the ENs firstly according to the preference value and secondly according to the distance value.

For the or each MAP option that is received, the MN 18 auto-configures an on-link CoA (LCoA) as per RFC 4140. If only one MAP option is received, the MN 18 also auto-configures a Regional CoA (RCoA) by appending its 64-bit interface identifier (e.g. MAC address) to the network prefix carried in the MAP option. However, if two or more different MAP options are received from the same or different ARs, the MN 18 does not auto-configure any RCoA at this stage, since the MN 18 does not yet know with which EN it will register. If the MN 18 receives more than one MAP option, it is important that the MN 18 auto-configures a number of LCoAs equal to the number of different network prefixes available in the MAP options that it receives.

This is because the LCoA is used as an identifier of the MN 18 as will be explained in greater detail below.

The MN 18 then prepares and sends to the serving EN 34 the network-layer address of the target EN 70 in the form of a Handover Preparation message at step S5-2; this message comprises a copy of the or each Router Advertisement that the MN 18 has received, each mapped to the LCoA that the MN 18 has configured. The format of the Handover Preparation message may be based on the Local Binding Update (LBU) message as described in section 4.1 of RFC 4140. The Mobility Options part of the message carries the or each Router Advertisement that the MN 18 has received; as such a new Option encoded using the type-value-length (TLV) format can be generated so that the Option is recognized by mobility agents. The LBU message is also modified by a two-bit flag (herein called the 'H' flag), taken from the Reserved section of the message, whose function is to indicate the purpose of the LBU to the serving EN. In particular a value in this flag of 00 indicates that the LBU is a normal message in which the MN asks to be registered with that EN. A value of 01 indicates the presence of the Router Advertisement(s) in the Mobility Options and therefore that the serving EN should take the action described below. The other two states of the flag will also be described below.

If the MN 18 is registered with more than one serving EN in the access network 14, it should send the same Handover Preparation message to each serving EN with which it is registered. Each serving EN that receives the message should act in the manner described below.

Upon receipt of the LBU message the serving EN 34 reads the H flag and discovers that the message is a Handover Preparation message. This triggers the serving EN 34 to read the Mobility Options part of the message and extract the or each Router Advertisement and the LCoA mapped thereto. The serving EN 34 then extracts the global network-layer address (e.g. IP address) of the or each target EN 70 (for the purposes of the remainder of this example, it will be assumed there is only one target EN available to the MN 18). At step S5-3 the serving EN 34 uses the source address in the IP packet(s) carrying the Handover Preparation message (i.e. the LCoA of the MN 18 in the serving access network) to lookup the current QoS context data of the MN 18 that is stored in the binding cache by the serving EN 34. A context is information on the current state of a service (i.e. session) required to re-establish that service on a new subnet (in this case a new subnet in the new access network) without having to perform the entire protocol exchange with the MN 18 from scratch. Two sorts of context data are helpful for the inter-access network handover: QoS information and mobility information. The QoS context may comprise data such as DiffServ codepoint (DSCP) for the or each ongoing session, and/or a certain required bandwidth (e.g. 300 kB s$^{-1}$), and/or the traffic class of the or each session of the MN 18. The serving EN 34 also extracts the new LCoA contained in the Handover Preparation message received from the MN 18—this LCoA is the mobility context data for the MN 18.

If the serving EN 34 does not have the QoS context data, at optional step S5-4 it contacts either any one or any combination of the serving GW 32, serving AR 20 and serving Bandwidth Broker 36. One or more of these logical entities will store the QoS context for the MN 18. The serving GW 32 and AR 20 send this information to the serving EN 34 at step S5-5.

At step S5-6 the serving EN 34 compiles a combined Mobility and QoS Context Transfer (MQCT) message. This message could be similar to a Binding Update message described in Mobile IPv6 and HMIPv6 for example. The message comprises the QoS context information and the mobility context information. In particular, the message comprises the bandwidth and/or DSCP of each ongoing session of the MN 18, together with the (or each) LCoA that the MN 18 has auto-configured. Sessions may be distinguished in the message using source and destination port numbers for example. The serving EN 34 then uses the global IP address of the target EN 70 to address IP packet(s) containing the MQCT, and sends those packets into the network. The function of the MQCT message is to trigger the new access network 15 to start its admission and bandwidth reservation procedures prior to commencement of a handover.

If there are two or more target ENs (represented by two or more different Router Advertisements sent by the MN 18 to the serving EN 34), the serving EN 34 chooses one and sends the MQCT message to that EN first. If the request is rejected by that target EN, the serving EN 34 chooses another target EN to send the MQCT message to. This process is repeated either until a target EN is found that will accept the MN 18, or until all possibilities are exhausted. In the latter circumstance, the MN 18 must revert to a Mobile IPv4 or Mobile IPv6 handover and the serving EN 34 may indicate this to the MN 18.

In order for the serving EN 34 to choose which target EN to send the MQCT message to first, the serving EN 34 may examine the Dist and/or Pref fields in the MAP option of each router advertisement. The Dist field is included in the MAP option according to RFC 4140 in order to identify the distance (which may or may not interpreted as the number of hops) between the target EN and the receiver of the advertisement (i.e. the MN 18 in this example). The Dist field is represented by a 4-bit integer. The Pref field is also a 4-bit integer indicating the preference of the target EN, which can be used to indicate overload or load sharing. A Pref value of zero indicates that the target EN should not be used for new binding updates, whilst a Pref value of 15 indicates that the target EN is fully available. Thus the serving EN 34 may select which target EN to contact first based on either one or a combination of both of these fields.

Figure 5B:
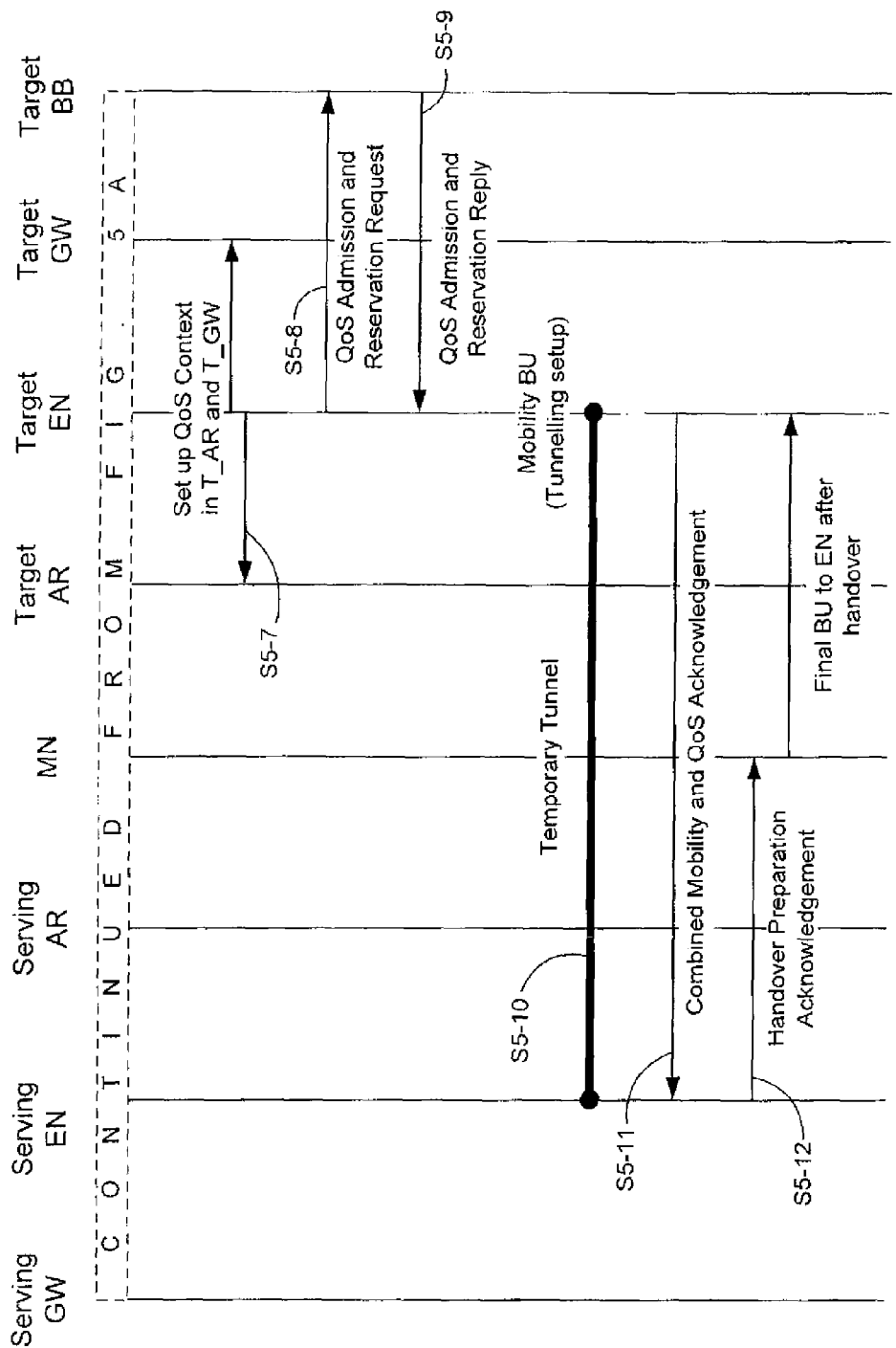

Referring now to FIG. 5B, the target EN 70 receives and reads the MQCT message. This triggers the target EN 70 at step S5-7 to activate calculation of at least one QoS route through the new access network 15 (target EN 70→target AR 22, and optionally target GW 74→target EN 70); this calculation is performed as per the Login Phase section above. However, instead of this determination being triggered by a login request message from the MN 18, it is triggered by a message sent from the target EN 70 to the target AR 22. This message can be a login type message sent by the target EN 70 on behalf on the MN 18 to initiate the route set up. Since the target EN 70 is 'trusted' by the new network, and once the target EN verifies the MN 18 then the network can trust all messages from the serving EN 34 on behalf on the MN 18. Once completed, optionally the target EN 70 then pre-computes a QoS route as described above from the target GW 74 to itself, and performs the other steps as per the Login Phase above. In this way the QoS information for the existing session(s) of the MN 18 in the current access network 14 is converted into at least one QoS route in the new access network 15 before handover takes place. The target EN 70 then stores a mapping between the LCoA of the MN 18 (as received in the MQCT message) and the QoS context data (including the at least one pre-computed QoS routes) it has just determined.

The target EN 70 then ascertains whether or not the resources requested by the MN 18 can be supplied by the network. To that end at step S5-8 the target EN 70 makes a Reservation Request to a Bandwidth Broker ('target BB' 72) within the new access network; after making the request the target EN 70 awaits a reply. The Reservation Request comprises the SLS (containing the current DSCP(s) for the session(s)) of the MN 18 as stored in the current access network and the at least one QoS route that has been calculated. Upon receiving the Reservation Request the target BB 72 determines whether or not there are sufficient resources available within the network to admit the MN 18 and its ongoing session(s). Assuming that the request is admitted, the BB 72 sends a suitable confirmation message to the target EN 70 at step S5-8.

One possibility is that the DCSP(s) may represent UMTS traffic classes as shown in Table 1 below:

TABLE 1

| MTS Traffic Class & No. | DSCP |
| --- | --- |
| Conversational-1 | 001010 |
| Streaming-2 | 010010 |
| Interactive-3 | 011010 |
| Background-4 | 100010 |

The target BB 72 may be able to admit the ongoing session(s) of any types of traffic. However, if the new network is congested, the target BB 72 may decide only to admit delay-sensitive traffic such as traffic classes 1 (e.g. VoIP) and 2 (e.g. streaming video) above, and reject any sessions in classes 3 and 4. At step S5-9 the target BB 72 sends a reply to the target EN 70 indicating whether or not the QoS routes are accepted and/or which sessions of the MN 18 are accepted.

Once the at least one QoS route has been determined and stored in target EN 70 (and optionally also the QoS route between the target GW 74 and target EN 70 is stored in the target GW 74), at step S5-10 the target EN 70 initiates establishment of a temporary tunnel with the serving EN 34 (using a three-way handshake to establish a TCP connection—these steps are not shown in FIG. 5B). To reduce wastage of network resources, however, IP packets arriving at the serving EN 34 are not duplicated and tunnelled to the target EN 70 at this stage. The temporary tunnel may be activated when the MN 18 performs or is just about to perform the handover. This status can be detected by link-layer triggers for example as the MN 18 starts a handover. Once the temporary tunnel is set up ready for use, the target EN 70 sends a MQCT Acknowledgement message (which may be based on the same format as a Binding Acknowledgement in Mobile IP or HMIP) to the serving EN 34 at step S5-11. The MQCT Acknowledgement comprises, as a minimum, the LCoA of the MN 18 in the new network; this serves to identity the MN 18 to the serving EN 34. Optional data that could be carried by the MQCT Acknowledgement includes QoS information (for example, either confirming the requested resources are available, or advising what other bandwidth/DSCP have been assigned by the new access network if the MN's request could not be met).

When the serving EN 34 receives the MQCT Acknowledgement, it prepares a Handover Preparation Acknowledgement to send to the MN 18 to inform the MN that resources have been reserved in the new access network and that inter-access network handover may take place. This message is based on the Binding Acknowledgement message described in RFC 4140 and RFC 3775, except for the addition of the aforementioned H flag (which can be taken from the bits in the reserved part of the message); the H flag is set to value 10 to indicate that this is not a standard Binding Acknowledgement and that the MN 18 should take further action on receiving it. If more than one Router Advertisement was sent from the MN 18 to the serving EN, the global IP address and sub-net prefix of the target EN is also sent in the Binding Acknowledgement as part of the Mobility Options. This data informs the MN 18 which target EN 34 best meets its QoS requirements.

Upon receiving the Binding Acknowledgement, the MN 18 reads the H flag and discovers that further action is required on its part. In particular, if only one Router Advertisement was sent by the MN 18, it may now configure a RCoA using the network prefix advertised in the MAP option. If two or more Router Advertisements were sent to the serving EN 34, the MN 18 reads the Mobility Options part of the Binding Acknowledgement to discover which target EN has accepted its sessions (by examining the global IP address contained in the message), and auto-configures a RCoA using the network prefix advertised in the corresponding Router Advertisement.

At this point the MN 18 is ready to perform network layer handover, and may await other triggers (e.g. L2 triggers or a trigger from the serving network) before executing the handover.

Handover Execution

For avoidance of confusion the reference to logical entities as 'serving' and 'target' will be preserved, even though once handover is completed, the 'target' EN becomes the 'serving' EN for the MN 18. Once the handover is triggered the MN 18 sends a local binding update to the serving EN 34 in order to de-register. Ordinarily this local binding update would trigger the EN 34 to establish a binding between the RCoA of the MN 18 in the current access network 14 and the new LCoA configured by the MN 18 from the MAP Option advertised by the target AR 22 (see RFC 4140 section 8). However, on receipt of the local binding update the serving EN 34 activates the temporary tunnel with the target EN 70 and begins duplicating packets and sending one set through the tunnel to the target EN 70.

Once the MN 18 has attached to the target AR 22 at the physical and link layers, the MN 18 sends a Local Binding Update as per RFC 4140 to the target EN 70 in order to register the new RCoA and new LCoA in the new access network 15. The Local Binding Update comprises the H flag, this time set to 11, to indicate to the target EN 70 that it has already performed the QoS routes calculation and resource reservation for the MN. On receipt of the LBU, the target EN 70 reads the message and finds the H flag set to 11; this triggers the target EN to use the source address of the LBU (i.e. the LCoA of the MN) to lookup the QoS route etc. that is has already stored. The target EN 70 sends the MN 18 a binding acknowledgement to confirm successful registration.

By performing handover preparation phase, the target EN 70 is ready to send and receive packets on behalf of the MN 18 via the one or more pre-computed QoS routes across the new access network 15, avoiding a delay caused if these steps were performed only on receipt of the local binding update from the MN 18. This is expected to greatly reduce delays and/or packet loss resulting from inter-access network handover.

Once the MN 18 is registered with the target EN 70, the MN 18 sends a binding update to its Home Agent (and to any Correspondent Node(s) if using Route Optimization) to register the new RCoA so that the Home Agent will forward packets to the new access network 15. Once the binding update is complete the temporary tunnel between the serving EN 34 and target EN 70 is torn down; for example, to trigger tear down the target EN may wait for a binding acknowledgement to arrive from the Home Agent destined for the MN 18.

Combining mobility and QoS achieves improved inter-access network domain handovers with reduced interruption in communications experienced by the mobile terminals (and primarily the users of those terminals). Previously, mobile nodes must first establish a binding with the MAP, and then carry out resource reservation procedures. If a reservation is rejected due to insufficient resources, the MAP must take further courses of action, albeit in a somewhat blind fashion, until a new reservation is agreed. The time taken to carry out such procedures may cause a perceivable interruption in communications to users. By combining QoS operation with mobility management operation user-perceived interruption in communication is reduced.

Furthermore, the transfer of network information between access networks using the mobile nodes permits two different networks to appear as a single logical network through the sharing of important information securely. Since the ENs are located within the networks and have established relationships with other ENs in other networks, they provide a form of tight coupling without having any physical connection between them. Under this framework even other mechanisms using mobility and QoS features can be proposed to optimize the network.

The mechanism described herein are based on the ENs and hence the network administrator is not required to perform major upgrades to implement the proposed solution.

The MN 18 may be a hand-held mobile terminal such as a phone, PDA, digital media player or notebook computer for example. The mobile node may also be a mobile router for example.

It will be appreciated that the invention is applicable to all varieties of micro mobility protocols and QoS routing protocols.

Although the embodiments of the invention described with reference to the drawings comprises computer apparatus and methods performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the methods according to the invention. The carrier may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal that may be conveyed via electrical or optical cable or by radio or other means.

When the program is embodied in a signal that may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant methods.

What is claimed is:

1. In a wireless network environment comprising first and second packet-switched access networks, each access network using a tunneling-type micro-mobility protocol and a Quality of Service (QoS) routing protocol to route packet data to and from mobile nodes attached thereto, and each access network comprising an access router to which a mobile node may attach, a mobility agent with which said mobile node may register and a gateway, a method of facilitating network layer handover of said mobile node from said first access network to said second access network, said mobile node registered in said first access network with a serving mobility agent, which method comprises the steps of:

(a) said mobile node receiving a router advertisement from said second access network, which router advertisement comprises a network-layer address of a target mobility agent in said second access network with which said mobile node may register; and (b) said mobile node forwarding said network-layer address to said serving mobility agent, whereby said serving mobility agent may communicate with said target mobility agent to facilitate network-layer handover of said mobile node to said second access network; and (c) said mobile node transmitting an identifier with said router advertisement, which identifier is useable to identify said mobile node in both said first and second access networks;

wherein following handover of said mobile node at the physical and link layers, said mobile node initiates a handover at the network layer by sending to said target mobility agent a registration message comprising said identifier with said router advertisement which identifier is useable to identify said mobile node in both said first and second access networks of said mobile node; and wherein upon receipt of said registration message said target mobility agent uses said identifier to look up pre-computed QoS route(s) stored for said mobile node.

2. A method according to claim 1, wherein step (b) comprises said mobile node forwarding said router advertisement substantially as received.

3. A method according to claim 1, further comprising the steps of said mobile node configuring said identifier as an on-link care-of address (LCoA) using data within said router advertisement, and forwarding said on-link care-of address to said serving mobility agent with said router advertisement.

4. A method according to claim 1, further comprising the step of said serving mobility agent storing and forwarding said identifier to said target mobility agent.

5. A method according to claim 1, further comprising the step of said first access network using said network-layer address to send handover data about ongoing session(s) of said mobile node to said second access network, upon receipt of which said second access network uses said data to perform at least a part of its admission procedure prior to handover of said mobile node.

6. A method according to claim 5, wherein said handover data comprises quality of service (QoS) context data useable by said target mobility agent to determine as part of said admission procedure whether or not said second access network is able to provide the same or a similar QoS to said ongoing session(s) of said mobile node.

7. A method according to claim 5, further comprising the step of said target mobility agent initiating computation of at least one QoS route across said second access network for packet data of said ongoing session(s) of said mobile node.

8. A method according to claim 5, wherein if said second access network has determined that it can meet QoS requirements of said ongoing session(s), either at the requested level or some other level, the method further comprises the step of establishing a temporary tunnel between said serving mobility agent and said target mobility agent, which temporary tunnel is useable to route packets arriving at said serving mobility agent intended for said mobile node to said target mobility agent.

9. A method according to claim 8, wherein following handover of said mobile node at the physical and link layers, said serving mobility agent forwards packets addressed to said mobile node through said temporary tunnel to said target access network.

10. A method according to claim 1, further comprising the step of said target access router storing said identifier for subsequent identification of said mobile node.

11. A method according to claim 1, wherein messages sent by said mobile node to said serving mobility agent and to said target mobility agent comprise a local binding update message of a type according to HMIPv6, which message comprises a flag indicate to said mobility agents whether the message is a normal local binding update, a local binding update with a router advertisement or a local binding update following handover preparation.

12. A packet-switched wireless access network using a tunneling-type micro-mobility protocol and a Quality of Service (QoS) routing protocol to route packet data to and from mobile nodes attached thereto, and which comprises an access router to which a mobile node may attach, a mobility agent with which said mobile node may register and a gateway, said mobile node registered in said packet-switched wireless access network with a serving mobility agent, said packet-switched wireless access network for facilitating network layer handover of said mobile node to another access network, and in which said serving mobility agent is configured to receive a network-layer address from said mobile node, which network layer address is of a target mobility agent in said other access network with which said mobile node may register, whereby said serving mobility agent may communicate with said target mobility agent using said network layer address to facilitate network-layer handover of said mobile node to said other access network, and in which said mobile node is configured to initiate handover at the network layer, following handover of said mobile node at the physical and link layers, by sending to said target mobility agent a registration message comprising an identifier with a router advertisement which identifier is useable to identify said mobile node in both said first and second access networks of said mobile node, and in which said target mobility agent is configured to use said identifier upon receipt of said registration message to look up pre-computed QoS route(s) stored for said mobile node.

13. A router comprising a memory storing computer executable instructions that when executed enable the router to receive a network-layer address from a mobile node, which network-layer address is of a target mobility agent in another access network, whereby said router may communicate with said target mobility agent in said other access network to facilitate network-layer handover of said mobile node to said other access network, in which first network said mobile node is configured to initiate handover at the network layer, following handover of said mobile node at the physical and link layers, by sending to said target mobility agent a registration message comprising an identifier with a router advertisement which identifier is useable to identify said mobile node in both said first and second access networks, and in which second network said target mobility agent is configured to use said identifier upon receipt of said registration message to look up pre-computed QoS route(s) stored for said mobile node.

14. A packet-switched wireless access network using a tunneling-type micro-mobility protocol and a Quality of Service (QoS) routing protocol to route packet data to and from mobile nodes attached thereto, and which comprises an access router to which a mobile node may attach, a target mobility agent with which said mobile node may register and a gateway, which packet-switched wireless access network is configured to receive handover data from another access network about an ongoing session(s) of said mobile node in said other access network, and upon receipt to use said handover data to perform at least a part of its admission procedure prior to handover of said mobile node from said other access network; and in which said serving mobility agent is configured to receive a network-layer address from said mobile node, which network layer address is of a target mobility agent in said other access network with which said mobile node may register, whereby said serving mobility agent may communicate with said target mobility agent using said network layer address; and in which said mobile node is configured to initiate handover at the network layer, following handover of said mobile node at the physical and link layers, by sending to said target mobility agent a registration message comprising an identifier with a router advertisement which identifier is useable to identify said mobile node in both said first and second access networks of said mobile node, and in which said target mobility agent is configured to use said identifier upon receipt of said registration message to look up pre-computed QoS route(s) stored for said mobile node.

15. A router comprising a memory storing computer executable instructions that when executed enable the router to receive handover data from another access network about an ongoing session(s) of a mobile node in a another access network, and upon receipt to use said handover data to perform at least a part of an admission procedure prior to handover of said mobile node from said other access network, in which first network said mobile node is configured to initiate handover at the network layer, following handover of said mobile node at the physical and link layers, by sending to said target mobility agent a registration message comprising an identifier with a router advertisement which identifier is useable to identify said mobile node in both said first and second access networks, and in which second network said target mobility agent is configured to use said identifier upon receipt of said registration message to look up pre-computed QoS route(s) stored for said mobile node.

16. A mobile node comprising a memory storing computer executable instructions that when executed cause said mobile node to perform the following steps:
    (a) determine whether each router advertisement it receives is from an access router in a first access network to which it is presently attached, or from a second access network different from said first;
    (b) if from a second access network, to forward said router advertisement to a serving mobility agent in said first access network, and to initiate a handover at the network layer, following handover of said mobile node at the physical and link layers, by sending to a target mobility agent in said second access network a registration message comprising an identifier with said router advertisement which identifier is useable to identify said mobile node in both said first and second access networks and is useable by said target mobility agent to look up pre-computed QoS route(s) stored for said mobile node.

17. A method of manufacturing a mobile node, which method comprises the steps of storing in a memory of said mobile node computer executable instructions that when executed perform the steps of:
    (a) determining whether each router advertisement it receives is from an access router in a first access network to which it is presently attached, or from a second access network different from said first;
    if from a second access network, to forward said router advertisement to a serving mobility agent in said first access network, and to initiate a handover at the network layer, following handover of said mobile node at the physical and link layers, by sending to a target mobility agent in said second access network a registration message comprising an identifier with said router advertisement which identifier is useable to identify said mobile node in both said first and second access networks and is useable by said target mobility agent to look up pre-computed QoS route(s) stored for said mobile node.

* * * * *